United States Patent
Roberts

(10) Patent No.: US 7,308,959 B2
(45) Date of Patent: Dec. 18, 2007

(54) DISPLACEMENT ON DEMAND WITH REGENERATIVE BRAKING

(75) Inventor: Alexander J. Roberts, Rochester, MI (US)

(73) Assignee: General Motors Corporation, Detroit, MI (US)

( * ) Notice: Subject to any disclaimer, the term of this patent is extended or adjusted under 35 U.S.C. 154(b) by 211 days.

(21) Appl. No.: 10/662,847

(22) Filed: Sep. 15, 2003

(65) Prior Publication Data

US 2005/0056475 A1 Mar. 17, 2005

(51) Int. Cl.
B60K 6/02 (2006.01)
(52) U.S. Cl. ............ 180/65.3; 180/65.2; 903/941
(58) Field of Classification Search ........... 180/65.3, 180/65.4, 65.8, 65.2
See application file for complete search history.

(56) References Cited

U.S. PATENT DOCUMENTS

| | | | |
|---|---|---|---|
| 6,070,680 A | 6/2000 | Oyama | |
| 6,307,277 B1 * | 10/2001 | Tamai et al. | 290/40 C |
| 6,422,972 B1 | 7/2002 | Eguchi | |
| 6,424,053 B1 | 7/2002 | Wakashiro et al. | |
| 6,612,386 B2 * | 9/2003 | Tamai et al. | 180/65.4 |
| 6,616,570 B2 * | 9/2003 | Wakashiro et al. | 477/5 |
| 6,629,024 B2 * | 9/2003 | Tabata et al. | 701/22 |
| 6,691,807 B1 * | 2/2004 | Bhavsar et al. | 180/65.2 |
| 6,763,903 B2 * | 7/2004 | Morimoto et al. | 180/65.2 |
| 6,772,724 B2 * | 8/2004 | Glugla et al. | 123/179.5 |
| 6,837,320 B2 * | 1/2005 | Wakashiro et al. | 180/65.2 |
| 6,886,524 B2 * | 5/2005 | Hanada et al. | 123/198 F |
| 6,943,460 B2 * | 9/2005 | Wakashiro et al. | 290/40 C |
| 6,950,739 B2 * | 9/2005 | Matsubara et al. | 701/103 |
| 2001/0050189 A1 * | 12/2001 | Shimizu | 180/65.2 |

* cited by examiner

Primary Examiner—Paul N. Dickson
Assistant Examiner—John D Walters

(57) ABSTRACT

A regenerative braking system for a vehicle includes a displacement on demand (DOD) engine having cylinders, a battery, and an electric machine having motor and generator modes. The electric machine is selectively driven by a wheel of the vehicle. A controller detects a braking condition of the vehicle and deactivates at least one of the cylinders in response to the braking condition. The controller operates the electric machine in the generator mode during the braking condition to charge the battery.

12 Claims, 2 Drawing Sheets

DISPLACEMENT ON DEMAND WITH REGENERATIVE BRAKING

FIELD OF THE INVENTION

The present invention relates to vehicle braking, and more particularly to a regenerative braking system for a vehicle.

BACKGROUND OF THE INVENTION

Some internal combustion engines include engine control systems that deactivate one or more cylinders under low load situations. For example, an eight cylinder engine can be operated using four cylinders to improve fuel economy by reducing pumping losses. This process is generally referred to as displacement on demand (DOD) or cylinder deactivation.

Electric hybrid vehicles include an engine and at least one electric machine. The electric machine draws current from the battery and powers the vehicle alone or in combination with the engine. During braking, the electric machine operates in a generator mode and assists braking by absorbing kinetic energy of the vehicle to slow vehicle motion. The generator converts the absorbed kinetic energy to current, which is used to recharge the battery. This process is commonly referred to regenerative braking.

In a hybrid vehicle, regenerative braking can be implemented when the vehicle is powered by the engine and/or the electric motor at the time of braking. However, during periods when the vehicle is driven by the engine, current that is produced by regenerative braking has been limited by engine braking. In other words, the engine slows the vehicle by absorbing some of the kinetic energy of the vehicle. As a result, less kinetic energy is absorbed through the regenerative braking, which reduces current generation.

SUMMARY OF THE INVENTION

The present invention provides a regenerative braking system for a vehicle. The regenerative braking system includes a displacement on demand (DOD) engine having cylinders, a battery, and an electric machine having motor and generator modes. The electric machine is selectively driven by a wheel of the vehicle. A controller detects a braking condition of the vehicle and deactivates at least one of the cylinders in response to the braking condition. The controller operates the electric machine in the generator mode during the braking condition to charge the battery.

The controller deactivates one of the cylinders of the engine in response to the braking condition. The controller detects termination of the braking condition and activates at least one of the cylinders in response. The controller selectively operates the electric machine in the motor mode to drive the wheel.

In yet other features, the controller selectively deactivates all of the cylinders of the engine and operates the electric machine in the motor mode to drive the wheel. The electric machine charges the battery when operating in the generator mode.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
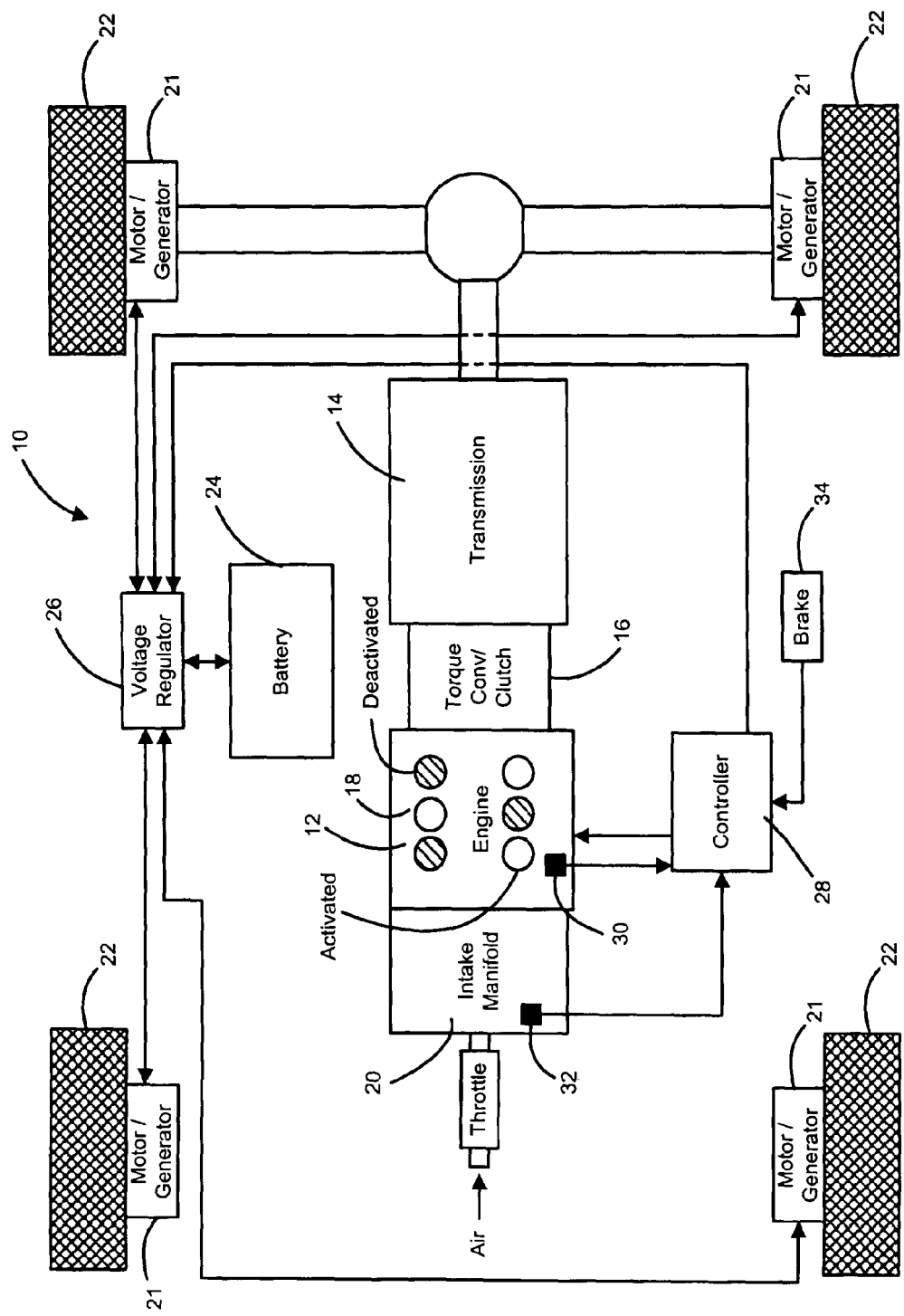
FIG. 1 is a functional block diagram of a hybrid vehicle including a DOD engine and a regenerative braking system.

The following description of the preferred embodiment is merely exemplary in nature and is in no way intended to limit the invention, its application, or uses. For purposes of clarity, the same reference numbers will be used in the drawings to identify similar elements. As used herein, activated refers to engine operation using all of the engine cylinders. Deactivated refers to engine operation using less than all of the cylinders of the engine (one or more cylinders not active).

The regenerative braking system of the present invention uses displacement on demand (DOD) in an electric hybrid vehicle to increase the current generated to recharge a battery. Specifically, if the engine is powering the vehicle and braking is initiated by an operator, cylinders of the engine are deactivated to reduce engine braking. The electric motors are able to absorb an increased amount of the vehicle's kinetic energy to produce current to charge the battery.

Referring now to FIG. 1, a vehicle 10 includes an engine 12 that drives a transmission 14. In the case of an automatic transmission, the transmission 14 is driven through a torque converter 16. In the case of a manual transmission, the transmission 14 is driven through a clutch 16. The engine 12 includes N cylinders 18 that are selectively deactivated during engine operation. Although FIG. 1 depicts six cylinders (N=6), it can be appreciated that the engine 12 may include additional or fewer cylinders 18. For example, engines having 4, 5, 6, 8, 10, 12 and 16 cylinders are contemplated. Air flows into the engine 12 through an intake manifold 20 and is combusted with fuel in the cylinders 18.

Electric machine/s 21 selectively drive or are driven by wheels 22. For example, when the vehicle 10 is operating in a motor mode, the electric machine/s 21 drive the wheels 22 and are powered by a battery 24. When the vehicle 10 is braking, the electric machine/s 21 are driven by the wheels 22 to slow rotation of the wheels 22 and to produce current that is used to charge the battery 24. The battery 24 communicates with the electric machine/s 21 via a voltage regulator 26. In the electric mode, the voltage regulator 26 regulates driving current from the battery 24 to the electric machine/s 21. In the braking mode, the voltage regulator 26 regulates charging current from the electric machine/s 21 to the battery 24.

A controller 28 communicates with the engine 12, an engine speed sensor 30, an intake manifold pressure sensor 32, a brake 34, and the voltage regulator 26. The controller 28 receives a signal from the pressure sensor 32 indicative of engine load. More particularly, as engine load varies, vacuum pressure within the intake manifold 20 correspondingly varies and is sensed by the pressure sensor 32. Although the exemplary embodiment uses manifold vacuum or pressure to indicate engine load, it can be appreciated that other methods of determining engine load can be employed.

During periods of light engine load, the controller 28 communicates with the engine to enable DOD. DOD occurs via deactivation of one or more cylinders 18. In an exemplary embodiment, N/2 cylinders are deactivated, although one or more cylinders may be deactivated. Upon deactivation of the cylinders 18, the controller 28 communicates with the engine 12 to increase the power output of the remaining cylinders 18.

The controller 28 continuously monitors driving conditions to selectively power the vehicle 10 electrically and/or using the engine 12. If the conditions are proper for electric drive, the controller 28 deactivates all of the cylinders 18 and drives the vehicle 10 with the electric machines 21 in the motor mode. When the brake 34 is depressed, the controller 28 receives a brake signal. In response, the controller 28 operates the electric machine/s 21 in the generator mode to retard motion of the vehicle 10 and signals the voltage regulator 26 to charge the battery 24 using current generated by the electric machine/s 21.

Figure 2:
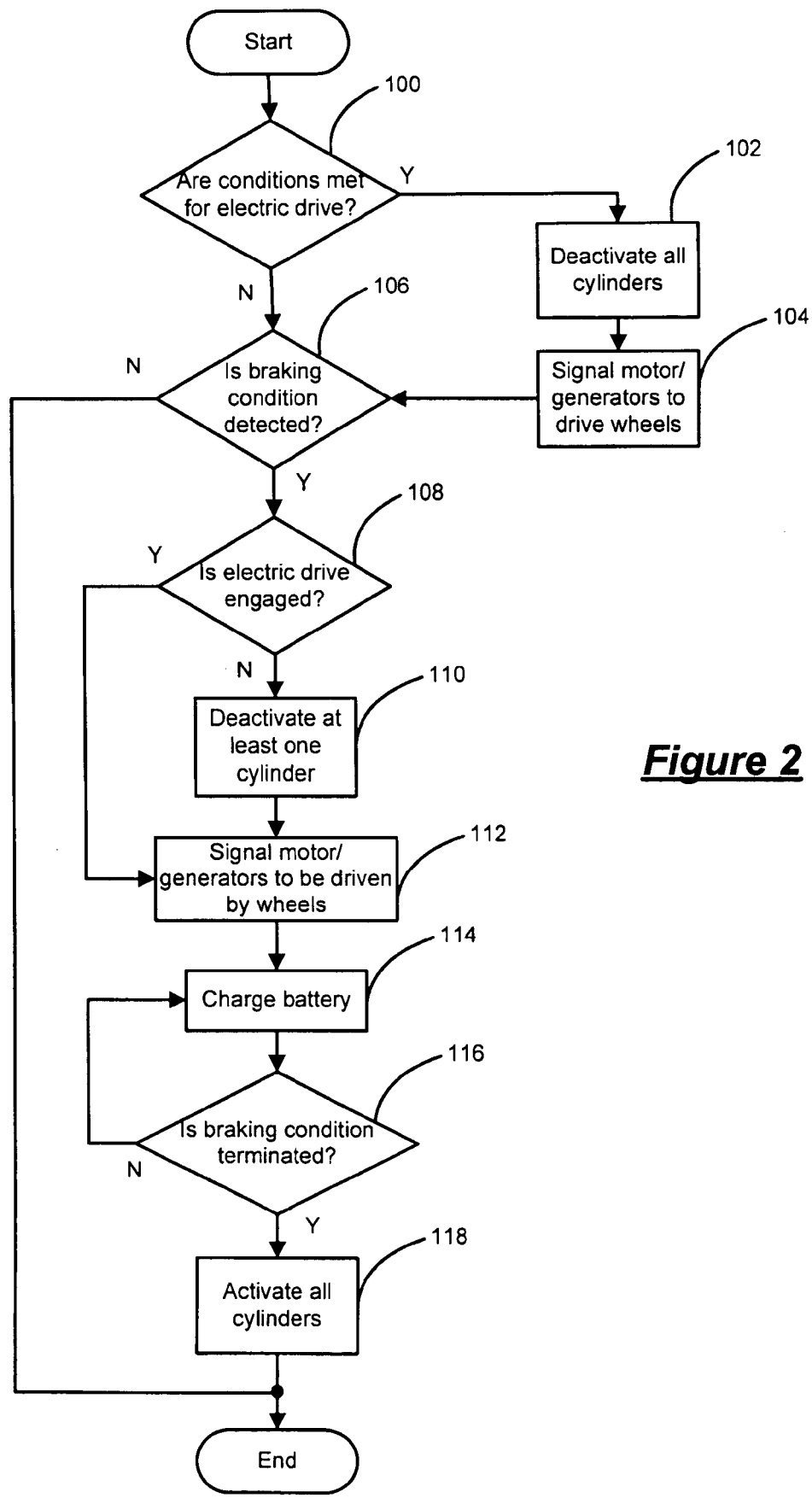
FIG. 2 is a flowchart illustrating steps performed by the regenerative braking system according to the present invention.

Referring now to FIG. 2, a method of improving regenerative braking efficiency will be described. In step 100, control determines whether conditions are met for electric drive. Electric drive is implemented under various driving conditions. For example during vehicle acceleration, the vehicle 10 may be driven by the engine 12. Once the vehicle is up to speed, electric drive may be implemented to maintain the vehicle at speed. If the electric drive conditions are met, control deactivates all of the cylinders 18 of the engine 12 in step 102 and signals the electric machine/s 21 to drive the wheels 22. If the electric drive conditions are not met, control continues in step 106 to determine whether a braking condition is detected. If a braking condition is detected, control continues in step 108. Otherwise, control ends.

In step 108, control determines whether electric drive is engaged. If not, control continues in step 110. Otherwise, control continues in step 112. In step 110, control deactivates at least one cylinder 18. In step 112, control signals the electric machine/s 21 to be driven by the wheels 22. In step 114, control signals the voltage regulator 26 to charge the battery 24 using the charging current generated by the electric machines 21. In step 116, control determines whether the braking condition has been terminated. If not, the voltage regulator 26 continues to charge the battery 24. If so, control activates one or more of the cylinders 18 of the engine 12 in step 118. Alternatively, it is anticipated that control can monitor a vehicle speed. If the vehicle speed has achieved a threshold, control activates one or more of the cylinders 18 of the engine 12.

The regenerative braking system of the present invention retains reduced engine braking to allow the electric motor/generators to absorb an increased amount of the vehicle's kinetic energy. Additionally, the fuel economy of the vehicle is increased as a result of the engine using less fuel during the deactivated mode.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

The invention claimed is:

1. A regenerative braking system for a vehicle, comprising:
    a displacement on demand (DOD) engine including cylinders;
    a battery;
    an electric machine that has motor and generator modes and that is selectively driven by a wheel of said vehicle; and
    a controller that detects a braking condition of said vehicle, that deactivates at least one of said cylinders while maintaining at least another of said cylinders active in response to said braking condition, that operates said electric machine in said generator mode during said braking condition to charge said battery, and that monitors a vehicle speed and activates at least one of said cylinders when said vehicle speed achieves a threshold.

2. The regenerative braking system of claim 1 wherein said controller detects termination of said braking condition and activates all of said cylinders in response to said termination.

3. The regenerative braking system of claim 1 wherein said controller selectively operates said electric machine in said motor mode to drive said wheel.

4. The regenerative braking system of claim 1 wherein said controller selectively deactivates all of said cylinders of said engine and operates said electric machine in said motor mode to drive said wheel.

5. A method of charging and discharging a battery in a vehicle, comprising:
    detecting a braking condition of said vehicle;
    deactivating at least one cylinder of an engine in response to said braking condition while maintaining at least another cylinder of said engine active;
    driving an electric machine in a generator mode with a wheel of said vehicle to charge said battery; and
    monitoring a vehicle speed and activating at least one of said cylinders when said vehicle speed achieves a threshold.

6. The method of claim 5 further comprising:
    activating said electric machine in a drive mode to drive said wheel.

7. The method of claim 6 further comprising providing electrical current to said electrical machine from said battery.

8. The method of claim 5 further comprising:
    detecting termination of said braking condition; and
    activating said at least one cylinder in response to said termination.

9. A method of operating a vehicle having a regenerative braking system, comprising:
    detecting a braking condition of said vehicle;
    deactivating a cylinder of an engine in response to said braking condition while maintaining at least another cylinder of said engine active;
    retarding motion of said vehicle by driving an electric machine in a generator mode with a wheel of said vehicle to generate electrical current;
    monitoring a vehicle speed; and
    activating at least one of said cylinders and relieving said retarding when said vehicle speed achieves a threshold.

10. The method of claim 9 further comprising charging a battery with said electrical current.

11. The method of claim 9 further comprising:
    activating said electric machine in a drive mode to drive said wheel.

12. The method of claim 11 further comprising providing electrical current to said electric machine from a battery.

* * * * *